(12) United States Patent
Frey et al.

(10) Patent No.: US 10,187,261 B2
(45) Date of Patent: Jan. 22, 2019

(54) SKELETAL REFRESH FOR MANAGEMENT PLATFORMS

(71) Applicant: Red Hat, Inc., Raleigh, NC (US)

(72) Inventors: Jason W. Frey, Cedar Knolls, NJ (US); Greg D. Blomquist, Apex, NC (US); Oleg Barenboim, Englewood Cliffs, NJ (US)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 15/054,315

(22) Filed: Feb. 26, 2016

(65) Prior Publication Data

US 2017/0250871 A1     Aug. 31, 2017

(51) Int. Cl.
*G06F 15/173* (2006.01)
*H04L 12/24* (2006.01)
*H04L 29/08* (2006.01)

(52) U.S. Cl.
CPC .......... *H04L 41/12* (2013.01); *H04L 41/0233* (2013.01); *H04L 41/0816* (2013.01); *H04L 67/02* (2013.01); *H04L 67/10* (2013.01); *H04L 67/125* (2013.01)

(58) Field of Classification Search
CPC ................................. H04L 69/08; G06F 9/455
USPC .............................. 709/230, 232, 223
See application file for complete search history.

(56) References Cited

U.S. PATENT DOCUMENTS

| | | |
|---|---|---|
| 6,374,254 B1 | 4/2002 | Cochran et al. |
| 7,574,383 B1 * | 8/2009 | Parasnis ........... G06Q 10/06315 705/22 |
| 8,171,142 B2 | 5/2012 | Kollin et al. |
| 8,856,319 B1 | 10/2014 | Huang et al. |
| 8,862,720 B2 | 10/2014 | DeHaan et al. |
| 9,143,407 B2 | 9/2015 | Zhang et al. |
| 9,143,563 B2 * | 9/2015 | Pingel ................... G06F 3/0604 |
| 2010/0306767 A1 | 12/2010 | Dehaan |
| 2012/0151040 A1 | 6/2012 | Mouravyov et al. |

(Continued)

OTHER PUBLICATIONS

"EMS Refresh Status", http://talk.manageiq.org/t/ems-refresh-status/266, Oct. 2014, 2 pages.

*Primary Examiner* — Wing F Chan
*Assistant Examiner* — Andrew Woo
(74) *Attorney, Agent, or Firm* — Lowenstein Sandler LLP

(57) ABSTRACT

A method of implementations includes determining, by a processing device in a management platform, an occurrence of an inventory event in a computing environment managed by the management platform, wherein the computing environment comprises a plurality of managed objects, and invoking a relationship handler to obtain identifying attributes for a target managed object corresponding to the inventory event. The relationship handler is further to update the identifying attributes and relationship attributes corresponding to the target managed object in an inventory tree maintained by the management platform, the relationship attributes comprising an identification of affiliations between two or more managed objects and for each managed object affiliated to the target managed object, and schedule a job in a message queue to update each of the attributes for the managed object, the detailed attributes comprising attributes of the managed object that are not identifying attributes or relationship attributes.

20 Claims, 5 Drawing Sheets

(56) References Cited

U.S. PATENT DOCUMENTS

2012/0304170 A1 11/2012 Morgan
2014/0173060 A1* 6/2014 Jubran .................. G06F 9/5061
                                                    709/220

* cited by examiner

SKELETAL REFRESH FOR MANAGEMENT PLATFORMS

TECHNICAL FIELD

This disclosure relates to computing resources, and more particularly, to skeletal refresh in a management platform.

BACKGROUND

Management platforms are integrated products that provide for the management of virtual infrastructure, public cloud environments, private cloud environments, hybrid cloud environments, containers, software-defined networks, software-defined storage, middleware and its applications, and physical data centers (which include many racks each of which has many computers, network devices, and storage devices all interconnected). Management platforms provide scalable self-service interfaces, provision virtual system images, enable metering and billing, and provide workload optimization through established policies.

Management platforms enable environment management tasks on top of a virtual infrastructure. Such management tasks may include, but are not limited to, providing a self-service portal and capabilities for granular permission for user access, metering and billing for chargeback and showback, ability to provision new instances and applications for an application catalog or from image templates, integration points with existing system management, service catalogs, and configuration management software, and an ability to control and automate the placement and provisioning of new instances based on business and security policies.

DETAILED DESCRIPTION

Figure 1:
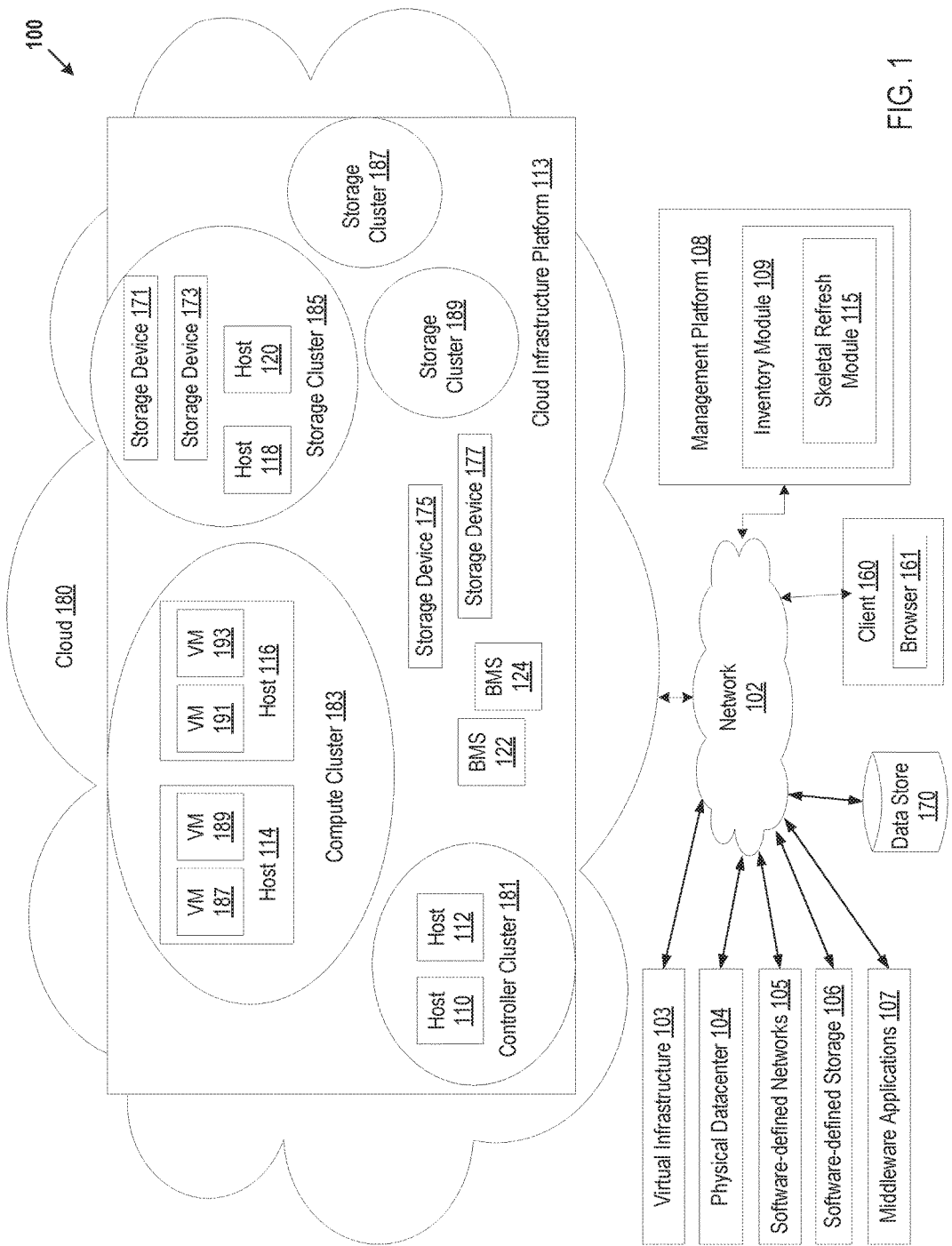
FIG. 1 is a block diagram that shows an example of a network architecture for a management platform computing environment.

Aspects and implementations of the present disclosure are directed to skeletal refresh for management platforms. Management platforms are implemented in order to manage the entities that may run in a computing environment. Examples of computing environments may include a virtual infrastructure, public cloud environments, private cloud environments, hybrid cloud environments, containers, software-defined networks, software-defined storage, middleware and its applications, and physical datacenters (which include many racks each of which has many computers, network devices, and storage devices all interconnected).

One example computing environment managed by a management platform may be a cloud computing environment (e.g., public cloud, private cloud, hybrid cloud). A cloud computing environment can include many entities operating in one or both of a non-virtual layer and/or a virtual layer. The virtual layer can include virtual resources, such as virtual machines (VMs) and containers. The non-virtual layer can include physical resources, such as a bare metal system (BMS). A bare metal system is a physical computing machine without virtualization. The management platform is responsible for collecting and monitoring the inventory (referred to herein as "managed objects") of a computing environment. However, inventory management by the management platform can be a resource-intensive and time-intensive process, particularly as the number of managed objects in the computing environment increases.

Aspects of the present disclosure provide a skeletal refresh process for inventory management by a management platform. Skeletal refresh may refer to an inventory process of the management platform that updates a minimal set of attributes for each inventory item, while separating and offloading updates of the more detailed attribute information for each inventory item to additional computing resources. The skeletal refresh process thus streamlines and improves efficiency of the management platform 108. The skeletal refresh process of implementations divides the inventory managed by the management platform into two domains: (1) relationships between managed objects, and (2) detailed information about each managed object. The skeletal refresh process collects inventory data of the two domains of the managed objects using a main inventory process and one or more auxiliary processes. The main inventory process collects relationship information between the managed objects and some minimal information that is used to create a managed object (e.g., the object's unique identifier and certain key properties, such as the power state and IP address of a virtual machine). The main inventory process keeps the inventory up-to-date with respect to the above-referenced limited amount of information for each managed object.

The one or more auxiliary processes collect the detailed information about each managed object. The one or more auxiliary processes can execute in parallel and can be distributed among multiple computing resources (e.g., multiple server computers). By separating the auxiliary processes from the main inventory collection process, the overall inventory refresh process of the management platform becomes a highly-scalable process.

Unlike conventional inventory management solutions that collect inventory data as a single process, the inventory module in implementations of the disclosure can provide a multi-threaded approach to inventory management by separating object relationship data from object detail data. The skeletal refresh process can cause the relationship data for object to be immediately updated and also cause detailed information regarding each managed object to be updated concurrently by multiple processes, improve scalability of the inventory process of the management platform.

FIG. 1 is an example system architecture 100 in which implementations of the present disclosure can be implemented. The system architecture 100 can include one or more different types of computing environments, including but not limited to, virtual infrastructure 103, a physical data center 104, software-defined networks 105, software-defined storage 106, middleware applications 107, and one or more clouds 180. A management platform 108 may manage entities of any of the one or more computing environments 103, 104, 105, 106, 107, 180.

Throughout this document, for brevity and simplicity, cloud 180 is used as an example computing environment that is managed by management platform 108. However, implementations of the disclosure may apply to other computing environments, such as virtual infrastructure 103, physical datacenter 104, software-defined network 105, software-defined storage 106, and/or middleware applications 107, to name a few examples.

Cloud 180 may be a public cloud, a private cloud, or a hybrid cloud. Cloud 180 can provide resources (e.g., compute resources, storage resources, network resources) to an entity. An entity, as referred to herein, can represent any software provider, service provider, a business organization such as a corporation, an educational institution such as a college and university, an individual, etc. For example, several sub-entities may be different departments within the same entity, such as an Enterprise company, and may store and access data in the cloud 180.

As described above, the cloud 180 can include a non-virtual layer and a virtual layer. The virtual layer can include virtual resources, such as VMs 187-193 and containers. The non-virtual layer can include physical resources, such as bare metal systems (e.g., BMS 122-124) and host machines ("host") (e.g., host machines 110-120). Bare metal systems 122,124 are physical computing machines that do not include any software or virtualization. Host machines 110-120 are physical computing machines that do include software (e.g., operating system) and/or virtualization. For example, host machine 114 is the underlying computing hardware used to host VMs 187-189. The underlying hardware (e.g., computing machines) of the physical layer of the cloud 180 can be physically located in one or more data centers for the cloud 180. Individual bare metal systems and hosts can be a server computer system, a desktop computer or any other computing device.

The cloud 180 can provide compute resources, storage resources, and/or network resources to end users. Compute resources can include processing devices, bare metal systems (e.g., BMS 122-124), virtual machines (e.g., VMs 187-193), software containers, host machines 110-120, applications, memory, hypervisors, etc. Storage resources can include, and are not limited to, storage servers, storage software, disks, data stores, etc. Network resources can be virtual network resources.

The infrastructure of the cloud 180 can be implemented by a cloud infrastructure platform 113. An example of a cloud infrastructure platform 113 can include and is not limited to Red Hat® OpenStack®. The cloud infrastructure platform 113 can implement one or more clusters in the cloud 180. Each cluster can be dedicated to performing one or more certain functions. A cluster hereinafter refers to a group of connected hosts that work together for one or more particular functions. The cloud 180 can include a controller cluster 181, a compute cluster 183, and one or more storage clusters 185. The controller cluster 181 can include one or more host machines (e.g., host machines 110,112) for managing networking infrastructure, APIs (application programming interfaces), and communications for the cloud 180.

The compute cluster 183 can include one or more host machines (e.g., host machines 114,116) for hosting virtual machines (e.g., virtual machines 187-193). There can be a large number of virtual machines, containers, and/or containers within virtual machines in the cloud 180. For brevity and simplicity, two virtual machines (e.g., VMs 187-189) hosted by host machine 114 and two virtual machines (e.g., VMs 191-193) hosted by host machine 116 are used as examples in system architecture 100.

The individual storage clusters 185-189 can include one or more hosts and one or more storage devices to manage storage for the data in the cloud 180. For brevity and simplicity, two host machines 118,120 and two storage devices 171,173 are used as examples in system architecture 100. For example, the storage cluster 185 can manage virtual hard drives on storage devices 171,173 for virtual machines 187-193 in the cloud 180. The storage devices 171,173 can create a storage array for storing data in the cloud 180.

The cloud 180 can include one or more types of storage clusters. One type of storage cluster (e.g., storage cluster 185) can manage block storage for virtual disks, for example, for the virtual machines (e.g., VMs 187-193) in the compute cluster 183. Another type of storage cluster (e.g., storage cluster 187) can manage object storage for files. Another type of storage cluster (e.g., storage cluster 189) can manage both block storage and object storage in a single cluster for the virtual machines in the compute cluster.

Users can interact with applications executing on cloud resources, such as VMs 187-193, using client computer systems, such as client 160, via corresponding applications (e.g., web browser program 161). There can be a large number of clients. For brevity and simplicity, client 160 is used as an example in architecture 100. The client 160 can be connected to the one or more hosts 114,116 in a compute cluster 183 via a network 102. The client 160 can be a mobile device, a PDA, a laptop, a desktop computer, or any other computing device.

As discussed above, the cloud infrastructure platform 113 of the cloud 180 can be managed by management platform 108. An example of a management platform 108 can include and is not limited to Red Hat® CloudForms. The cloud infrastructure platform 113 of the cloud 180 can be coupled to the management platform 108 via the network 102, which may be a private network (e.g., a local area network (LAN), a wide area network (WAN), intranet, or other similar private networks) or a public network (e.g., the Internet). Similarly, management platform 108 may connect to other types of computing environments, such as virtual infrastructure 103, a physical data center 130, software-defined networks 140, software-defined storage 150, and middleware applications 160 via network 102. In other implementations, the management platform 108 may directly connect to any of the computing environments 103, 104, 105, 106, 107.

The management platform 108 can be hosted by one or more machines (e.g., server computers, desktop computers, etc.). The management platform 108 may be maintained by a cloud consumer of the cloud 180, such as an Enterprise (e.g., business, company). In another implementation, the management platform 108 may be maintained by a cloud provider. The management platform 108 can be coupled to multiple clouds via one or more networks 102.

In one implementation, management platform 108 manages the inventory of the computing environment, such as the inventory of cloud infrastructure platform 113. The inventory of a computing environment may refer to all of the information that the management platform 108 collects about the computing environment in order to make management decisions. Inventory can include resources deployed (e.g., bare metal systems, hosts, virtual machines, containers, containers within VMs, storage devices, storage servers, etc.) in the computing environment 103, 104, 105, 106, 107, 180, as well as the relationships between the resources. In one implementation, the inventory managed by management platform 108 is referred to herein as "managed objects." In the example of the cloud infrastructure platform 113, inventory may refer to all of the information that the management platform 108 collects about the cloud infrastructure platform 113 in order to make management decisions.

The inventory managed by the management platform 108 can include large amounts of information. Managing this information can be a time-intensive and resource-intensive task that does not lend itself to scalability. In one implementation, management platform 108 includes an inventory module 109 with a skeletal refresh module 115 to provide a skeletal refresh process for the managed objects. The inventory module 109 and skeletal refresh module 115 make the inventory management performed by the management platform 108 a scalable and less time-intensive and resource-intensive process.

The skeletal refresh process of implementations divides the inventory managed by the management platform 108 into two domains: (1) relationships between managed objects, and (2) detailed information about each managed object. The skeletal refresh module 115 collects inventory data of the two domains of the managed objects using a main inventory process and one or more auxiliary processes. The main inventory process collects relationship information between the managed objects and some minimal information (e.g., identifying attributes) that is used to create a managed object (e.g., the object's unique identifier and certain key properties, such as the power state and IP address of a virtual machine). The main inventory process keeps the inventory up-to-date with respect to the above-referenced limited amount of information for each managed object.

The one or more auxiliary processes collect the detailed information about each managed object. The detailed information may also be referred to herein as "Detailed attributes" and refers to those attributes of a managed object that do not include the minimal information (e.g., identifying attributes) or relationship information (e.g., relationship attributes) obtained and updated by the main inventory process. The one or more auxiliary processes can execute in parallel and can be distributed among multiple computing resources (e.g., multiple server computers). By separating the auxiliary processes from the main inventory collection process, the overall inventory refresh process of the management platform 108 becomes a highly-scalable process.

Unlike conventional cloud solutions that collect inventory data as a single process, the inventory module 109 in implementations of the disclosure can provide a multi-threaded approach to inventory management by separating object relationship data from object detail data. The skeletal refresh module 115 can cause the relationship data for objects to be immediately updated and also cause detailed information regarding each managed object to be updated concurrently by multiple processes, improve scalability of the inventory process of the management platform 108.

Figure 2:
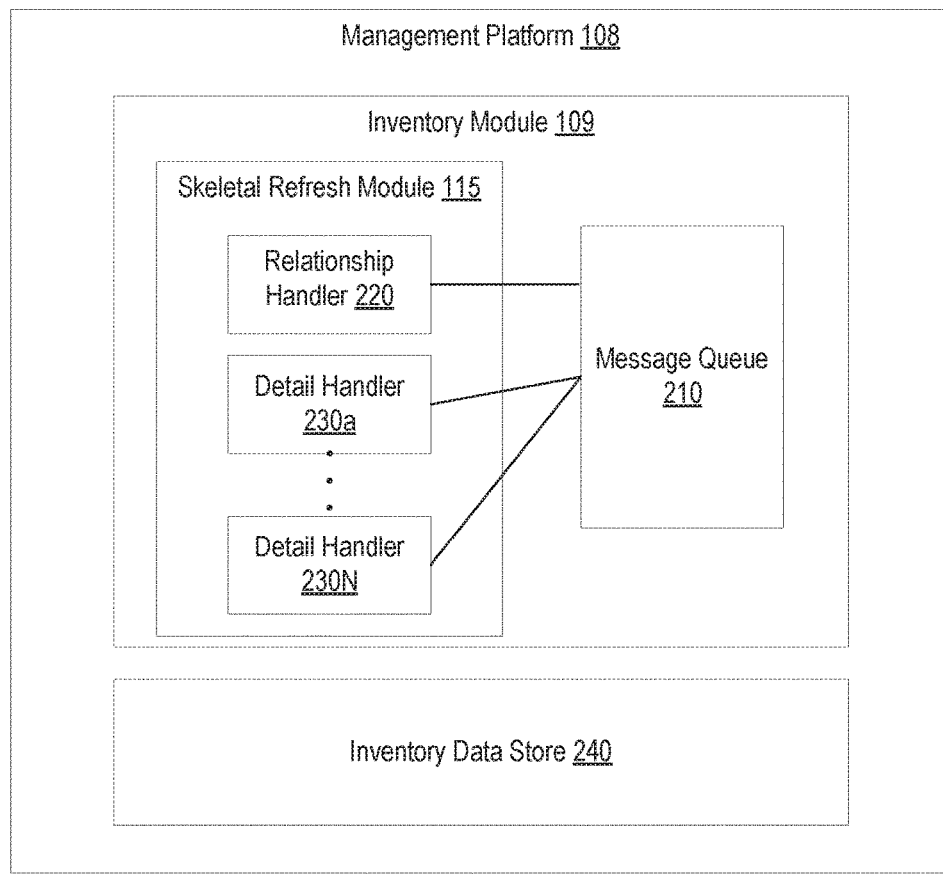
FIG. 2 is a block diagram that shows an example of a management platform architecture.

FIG. 2 is a block diagram of management platform 108 according to implementations of the disclosure. In one implementation, management platform 108 is the same as its counterpart described with respect to FIG. 1. Management platform 108 includes an inventory module 109, which also may be the same as its counterpart described with respect to FIG. 1. Inventory module 109 may include a skeletal refresh module 115 and a message queue 230. The skeletal refresh module 115 may be the same as its counterpart described with respect to FIG. 1.

The skeletal refresh module 115 divides inventory managed by the management platform 108 into two domains: (1) relationships between managed objects, and (2) detailed information about each managed object. The skeletal refresh module 115 collects inventory data of the two domains of the managed objects using a main inventory process and one or more auxiliary processes.

In one implementation, the inventory data includes managed objects. Each managed object of the management platform includes a native identifier (ID) to uniquely identify the managed entity with the management platform. The managed objects may vary according to entities using the cloud. For example, when virtualization systems are managed by the management platform, the managed objects may include virtual machines, hosts, clusters, folders, resource pools, and other metadata representing how the entity groups its managed objects together (i.e., topology of the management objects). When a cloud environment is managed by the management platform, the managed objects may include availability zones and network information.

In one implementation, when a platform-as-a-service (PaaS) system is managed by the management platform, the managed objects may include containers, pods, and so on. A container may refer to an isolated, portable computing environment that can run applications, along with all the libraries and dependencies that the applications need. A container may share system resources of the underlying computing device for access to compute, networking, and storage. All containers on the same host share the same operating system (OS) kernel, and keep applications, runtimes, and various other services separate from each other using kernel features known as namespaces and cgroups. A pod may refer to a colocated group of applications running with a shared context. Within that context, the applications may have individual cgroup isolations applied.

In some cases, each managed object may have detailed information associated with it. As discussed above, this detailed information may also be referred to as detailed attributes and includes those attributes of a managed object that are not the identifying attributes or relationship attributes that are obtained and updated by a main inventory process (i.e., the relationship handler) as discussed further below. For example, the detailed information associated with a virtual machine may include, but is not limited to, disks, network interface cards (NICs), networking data (e.g., local area network (LAN), etc.), storage on which the virtual machine is stored, file that represents the virtual machine on the storage, and so on. Similarly, detailed information about a host may include identifying information of virtual machines residing on the host, disks, NICs, physical devices on the host, IP address, host name, storages attached to the host, and so on. In another example, detailed information about a cluster may include the hosts in the cluster, a name of the cluster, summary information (e.g., total amount of memory, CPU, etc.), and so on.

As discussed above, the skeletal refresh module 115 divides the inventory managed by the management platform 108 into two domains: (1) relationships between managed objects, and (2) detailed information about each managed object. The skeletal refresh module 115 collects inventory data of the two domains of the managed objects using a main inventory process and one or more auxiliary processes.

In one implementation, an inventory event may trigger the skeletal refresh module 115 to implement a skeletal refresh process. The inventory event may refer to, for example, a new managed object being added to or removed from the system managed by the management platform 108, a change in structure to the system managed by the management platform 108 (e.g., a virtual machine migrated between hosts, etc.), a periodic scheduled refresh event, a manually-invoked refresh event, and so on. In some implementations, the inventory module 109 may poll managed entities to determine whether an inventory event has occurred and/or the inventory module 109 may perform a blocking call to determine when inventory events have occurred. In other implementations, a notification or other indication generated by a component of the management platform 108 or its managed entities may signal the occurrence of the inventory event to the management platform 108.

When the inventory event is detected, the skeletal refresh module 115 invokes a relationship handler 220 to implement the main inventory process. The relationship handler 220 may be a component that includes a set of routines dedicated to handling the collection and updating of relationship information as part of an inventory update process. As discussed above, the relationship handler 220 routines may be invoked or triggered upon occurrence and detection of an inventory event in the system managed by the management platform 108.

The relationship handler 220 may communicate with managed entities (e.g., providers) of the management platform 108 to obtain identifying attributes (e.g., the native ID and other key detailed information, such as power state and IP address for a virtual machine) about a managed object (also referred to herein as "target managed object") corresponding to the inventory event. An attribute may refer to a piece of information or data that determines the properties of a field or a tag in a data store or a string of characters. These identifying attributes may also be referred to herein as key information or key attributes of the target managed object. The relationship handler 220 is configured to communicate with the managed entity that it requests managed object information from, and may communicate with the managed entity according to an application programming interface (API) protocol specific to that managed entity.

The relationship handler 220 is also configured with the identifying attribute information to request from an entity for a managed object. The identifying attribute information may be used to create a new managed object in an inventory tree maintained by the management platform to manage inventory of the system. The inventory tree may refer to a data structure representing a hierarchical arrangement of managed objects corresponding to a managed entity. For example, if the relationship handler 220 detects that a new managed object is added to the system, the relationship handler 220 attaches the new managed object to the inventory tree using the obtained identifying attribute information. If the managed object already exists, the identifying attribute information may be used to identify the managed object in the inventory tree and/or update the managed object in the inventory tree. The inventory tree may be stored in inventory data store 240.

The relationship handler 220 updates relationship information corresponding to the inventory event. Relationship information may refer to identification of affiliations (e.g., child/parent, group membership, etc.) between two or more managed objects. For example, when a new virtual machine is added to the system, the relationship handler 220 would update relationship information for the new virtual machine managed object by adding identification of the virtual machine (e.g., the native ID of the new managed object of the virtual machine) to a corresponding host managed object (i.e., the host machine executing the virtual machine) in the system. The relationship handler 220 keeps the inventory collected by the management platform 108 up-to-date with respect to the limited amount of information collected by the relationship handler 220 for each managed object.

Once the relationship handler 220 verifies that all relationship information associated with an inventory event is up-to-date, the relationship handler 220 signals a detail handler 230a-N (e.g., via message queue 210) to collect the detailed information about the managed object. In some implementations, the relationship handler 220 may schedule jobs in the message queue 210 for the managed objects that were affected by (e.g., related to the target managed object) the inventory event handled by the relationship handler 220. In other implementations, when the scope of the inventory event is not clear or system configurations dictate otherwise, the relationship handler 220 may schedule jobs in the message queue 201 for all managed objects in the system managed by the management platform 108. In one implementation, to schedule a detail handler 230a-n job in the message queue 210, the relationship handler 220 writes the type of managed object and the unique ID (e.g., native ID) for that managed object into the message queue 210.

Skeletal refresh module 115 may invoke a scalable number of detail handlers 230a-N according to available resources of the system. When a new detail handler 230a-N is invoked, it retrieves the first job in the message queue 210 for handling. The detail handler 230a-N may include a set of routines dedicated to handling the collection and updating of detailed information (i.e., all attributes of a managed object) about managed objects as part of the inventory update process of the system managed by the management platform 108. In one implementation, a single detail handler 230a-N is responsible for obtaining detailed information for attributes (e.g., for a virtual machine, may collect disk information, NIC information, network information, storage information, and so on) of a single managed object, so that there is a one-to-one correspondence between detail handlers 230a-230N and managed objects. In other implementations, a detail handler 230a-N may be responsible for obtaining detailed information about more than one managed object. The one or more detail handlers 230a-N may execute in parallel and their execution may be distributed among multiple computing resources (e.g., multiple server computers). By separating the detail handler 230a-N processes from the relationship handler 220 collection process, the overall inventory collection process of the inventory module 109 becomes highly-scalable.

Figure 3:
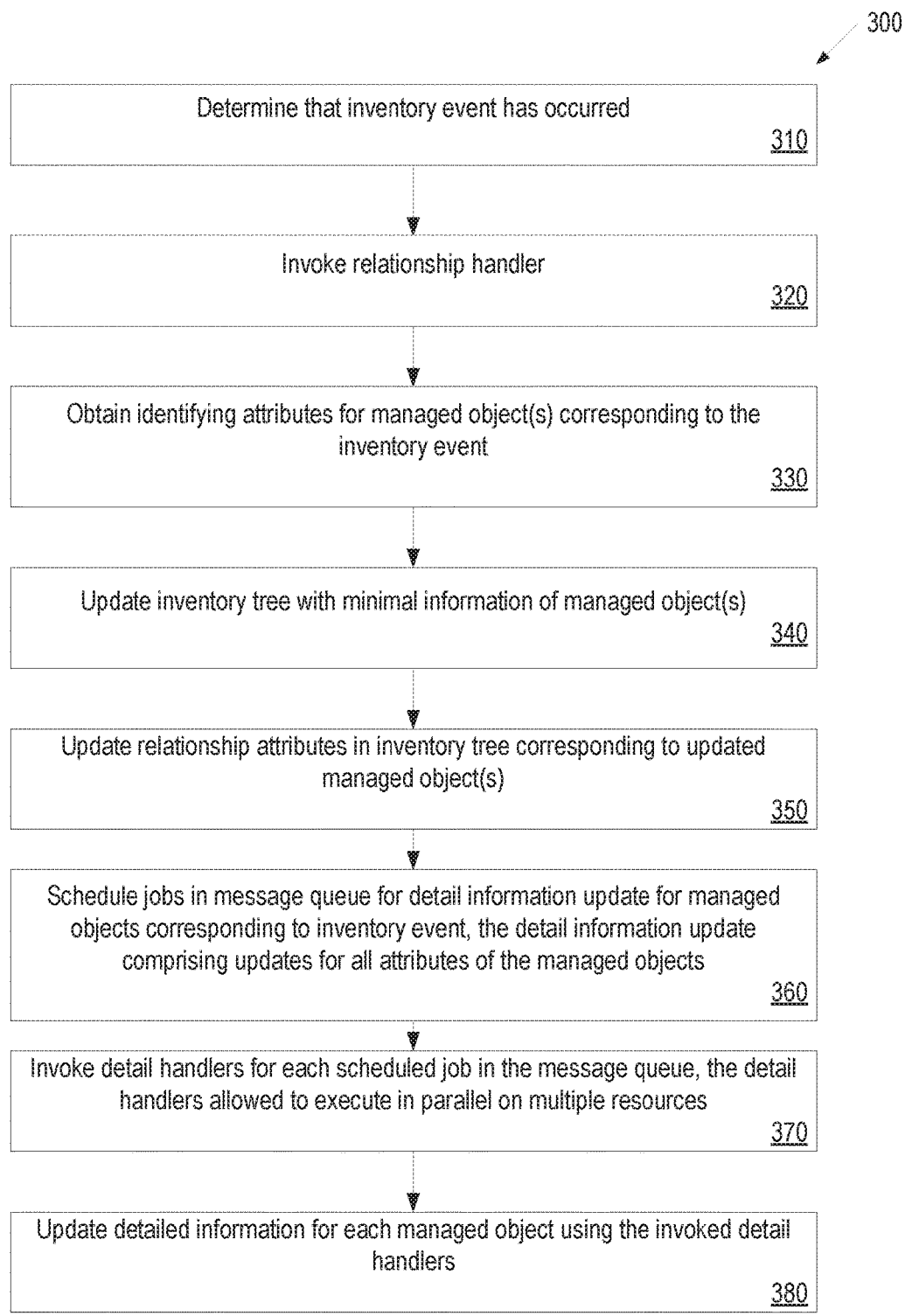
FIG. 3 is flow chart that shows an example of a process for skeletal refresh in a management platform architecture.

FIG. 3 is a flow diagram for a method 300 for skeletal refresh in a management platform, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by an inventory module (e.g., inventory module 109 of FIG. 1) executed by a processing device in a computing machine. At least a portion of method 300 can be performed by the computing machine without user interaction.

At block 310, the processing device determines that an inventory event has occurred. Then, at block 320, a relationship handler is invoked. At block 330, the relationship handler collects minimal information for one or more managed objects corresponding to the detected inventory event. Subsequently, at block 340, the relationship handler updates an inventory tree with the minimal information of the one or more managed objects. In addition, at block 350, the relationship handler updates relationship information for the one or more managed objects in the inventory tree.

At block 360, the relationship handler schedules jobs in a message queue for detail information updates for managed objects that correspond to the inventory event. The detail information update may include updating all attributes for the corresponding managed object of a scheduled job. In some implementations, the relationship handler schedules jobs in the message queue for all managed objects in the system. At block 370, detail handlers are invoked for each scheduled job in the message queue. A detail handler may be invoked individually for a single managed object. The detail handlers are allowed to execute in parallel and on multiple different resources. Lastly, at block 380, detailed information for each managed object is updated using the invoked detail handlers.

Figure 4:
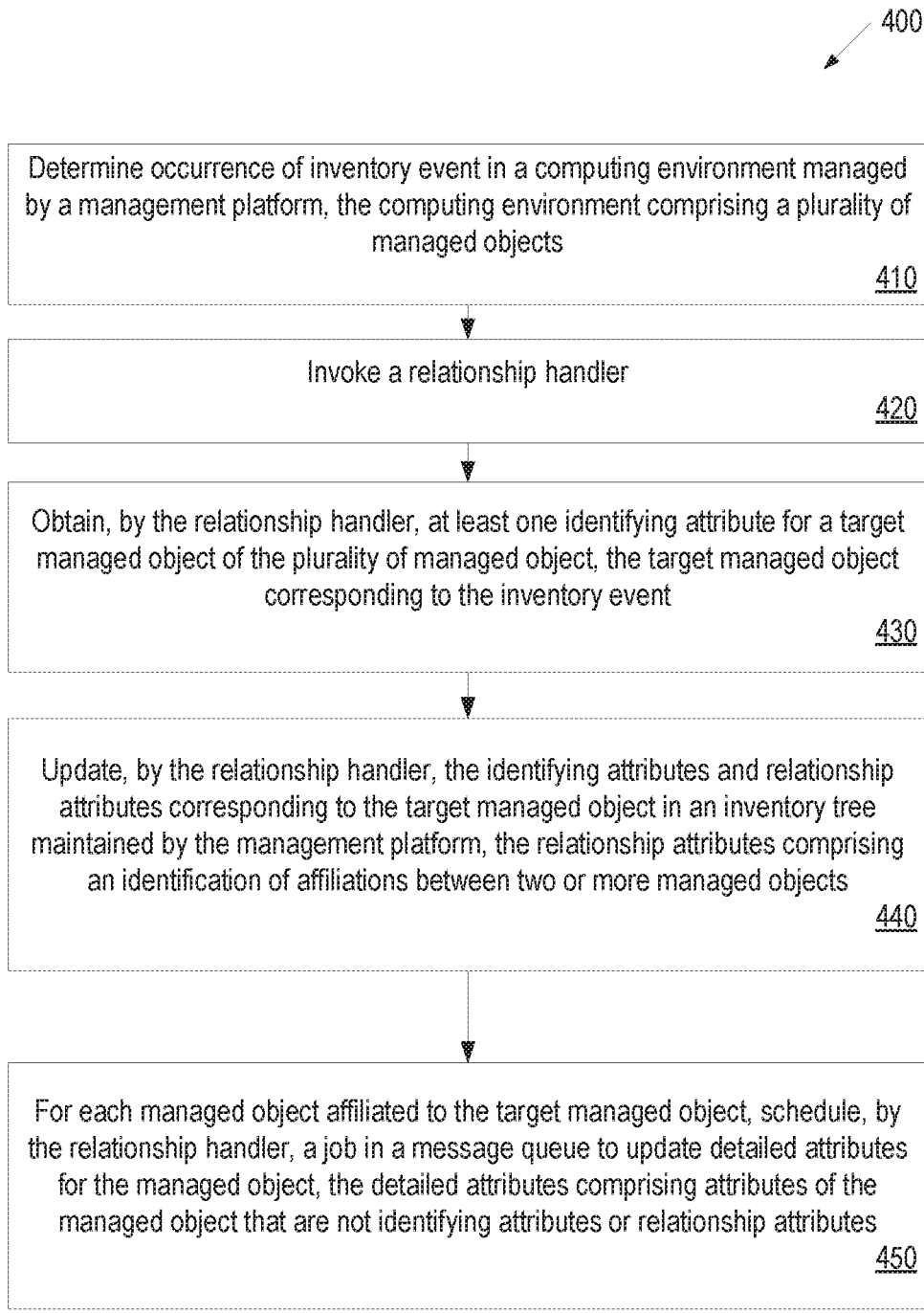
FIG. 4 is flow chart that shows an example of another process for skeletal refresh in a management platform architecture.

FIG. 4 is a flow diagram for another method 400 for skeletal refresh in a management platform, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by an inventory module (e.g., inventory module 109 of FIG. 1) executed by a processing device in a computing machine. At least a portion of method 400 can be performed by the computing machine without user interaction.

At block 410, the processing device determines that an inventory event has occurred in a computing environment managed by a management platform. The computing environment includes a plurality of managed objects. Then, at block 420, a relationship handler is invoked. At block 430, the relationship handler obtains at least one identifying attributes for a target managed object of the plurality of managed objects. The target managed object corresponds to the inventory event. Subsequently, at block 440, the relationship handler updates the identifying attributes and relationship attributes corresponding to the target managed object in an inventory tree maintained by the management platform. The relationship attributes include an identification of affiliations between two or more of managed objects. At block 450, for each managed object affiliated to the target managed object, the relationship handler schedules a job in a message queue to update detailed attributes for the managed object, where the detailed attributes comprise attributes of the managed object that are not identifying attributes or relationship attributes.

Figure 5:
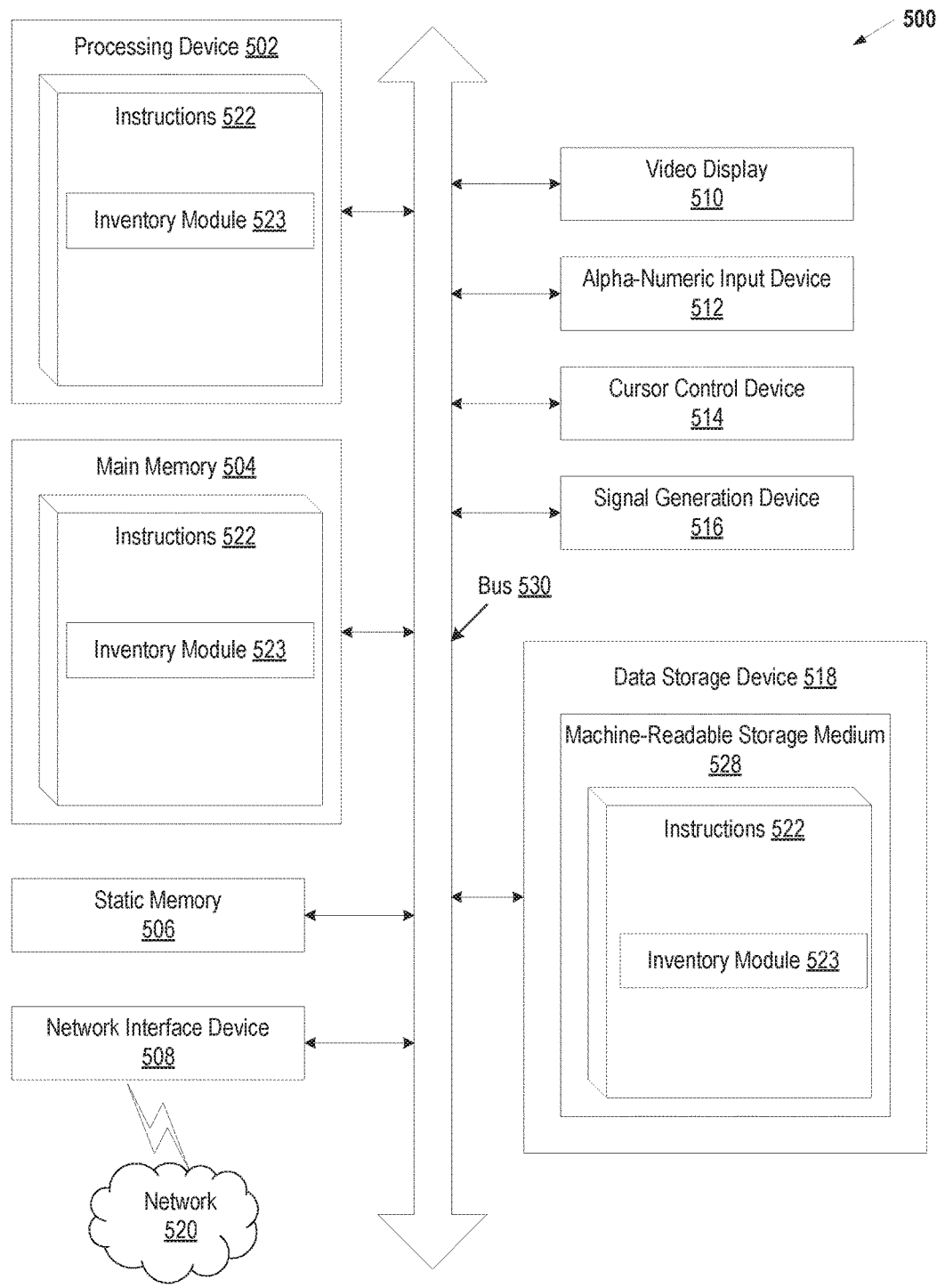
FIG. 5 is a schematic diagram that shows an example of a computing system.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for an inventory module 523 (e.g., inventory module 109 of FIG. 1), and/or a software library containing methods that call the scaling module 523. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the noted purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device in a management platform, an occurrence of an inventory event in a computing environment managed by the management platform, wherein the computing environment comprises a plurality of managed objects;
   invoking, by the processing device, a relationship handler to:
      obtain identifying attributes for a target managed object of the plurality of managed objects, the target managed object corresponding to the inventory event; and
      as part of a main inventory process, update the obtained identifying attributes and relationship attributes corresponding to the target managed object in an inventory tree maintained by the management platform, the relationship attributes comprising an identification of affiliations between managed objects of the plurality of managed objects; and
   invoking, by the processing device, a plurality of detail handlers to update, as part of auxiliary inventory processes that are separate from the main inventory process, detailed attributes for each of the managed objects of the plurality of managed objects affiliated to the target managed object, the detailed attributes comprising attributes of the managed object that are not the identifying attributes or the relationship attributes, the updating of the detailed attributes performed via scheduled jobs in a message queue, the scheduled jobs executed by the plurality of detail handlers in parallel via multiple computing resources of different computing devices of the management platform.

2. The method of claim 1, wherein the obtained identifying attributes comprise a unique identifier corresponding to the target managed object.

3. The method of claim 1, wherein the plurality of managed objects comprise at least one of virtual machines, hosts, clusters, folders, resource pools, metadata representing topology of the plurality of managed objects, availability zones, network information, containers, or pods.

4. The method of claim 1, wherein the inventory event comprises at least one of adding the target managed object to the computing environment, removing the target managed object from the computing environment, a periodic inventory refresh event, or a manual inventory refresh event.

5. The method of claim 1, wherein, for each of the scheduled jobs in the message queue, one of the plurality of detail handlers is invoked to update the detailed attributes of each of the managed objects of the plurality of managed objects corresponding to each of the scheduled jobs, the one of the plurality of detail handlers to execute in parallel with other detail handlers corresponding to other scheduled jobs in the message queue.

6. The method of claim 5, wherein the one of the plurality of detail handlers executes in parallel with the other detail handlers on the different computing devices than the other detail handlers.

7. The method of claim 1, wherein the relationship handler further to schedule the job in the message queue for each of the managed objects of the plurality of managed objects in the computing environment.

8. The method of claim 1, wherein the relationship handler comprises a set of routines dedicated to handling obtaining and updating the relationship attributes for each of the managed objects of the plurality of managed objects as part of an inventory update process of the computing environment, and wherein the plurality of detail handlers comprise another set of routines dedicated to handling the obtaining and the updating detailed attributes for each of the managed objects of the plurality of managed objects as part of the inventory update process of the computing environment.

9. The method of claim 1, wherein the computing environment comprises at least one of a virtual infrastructure, a public cloud environment, a private cloud environment, a hybrid cloud environment, a software-defined network, a software-defined storage, a middleware application, a container, or a physical data center.

10. A non-transitory computer-readable medium having instructions stored therein that, when executed by a processing device, cause the processing device to:
responsive to an inventory event in a computing environment managed by a management platform, invoke, by the processing device, a relationship handler;
obtain, by the processing device via the relationship handler, identifying attributes for a target managed object of the computing environment, the target managed object corresponding to the inventory event;
as part of a main inventory process, update the obtained identifying attributes and relationship attributes corresponding to the target managed object in an inventory tree maintained by the management platform, the relationship attributes comprising an identification of affiliations between managed objects of a plurality of managed objects; and
invoke a plurality of detail handlers to update, as part of auxiliary inventory processes that are separate from the main inventory process, detailed attributes for each of the managed objects of the plurality of managed objects affiliated to the target managed object, the detailed attributes comprising attributes of each of the managed object that are not the obtained updated identifying attributes or the updated relationship attributes, the updating of the detailed attributes performed via scheduled jobs in a message queue, the scheduled jobs executed by the plurality of detail handlers in parallel via multiple computing resources of different computing devices of the management platform.

11. The non-transitory computer-readable medium of claim 10, wherein the obtained identifying attributes are a subset of the obtained identifying attributes of the target managed object and comprise a unique identifier corresponding to the managed object.

12. The non-transitory computer-readable medium of claim 10, wherein the target managed object is one of a plurality of managed objects each comprising at least one of virtual machines, hosts, clusters, folders, resource pools, metadata representing topology of the managed objects, availability zones, network information, containers, or pods.

13. The non-transitory computer-readable medium of claim 10, wherein the inventory event comprises at least one of adding the target managed object to the computing environment, removing the target managed object from the computing environment, a periodic inventory refresh event, or a manual inventory refresh event.

14. The non-transitory computer-readable medium of claim 10, wherein the relationship handler further to schedule each of the plurality of the managed job in the message queue for managed objects in the computing environment.

15. The non-transitory computer-readable medium of claim 10, wherein the relationship handler comprises a set of routines dedicated to handling collection and the updating of the managed object of the relationship attributes as part of an inventory update process of the computing environment, and wherein the plurality of detail handlers each comprise a set of routines dedicated to handling the collection and the updating of the detailed attributes for the managed objects as part of the inventory update process of the computing environment.

16. A system comprising:
a memory to store an inventory tree for a management platform; and
a processing device communicably coupled to the memory, the processing device to:
determine an occurrence of an inventory event in a computing environment managed by the management platform, wherein the computing environment comprises a plurality of managed objects;
obtain identifying attributes that are a first subset of attributes for a target managed object of the plurality of managed objects, the target managed object corresponding to the inventory event;
as part of a main inventory process, update the obtained identifying attributes and relationship attributes corresponding to the target managed object in the inventory tree maintained by the management platform, the relationship attributes comprising a second subset of the attributes of the target managed object that provide an identification of affiliations between managed objects of the plurality of managed objects; and
invoke a plurality of detail handlers to update, as part of auxiliary inventory processes that are separate from the main inventory process, detailed attributes for each of the managed objects of the plurality of managed objects affiliated to the target managed object, the detailed attributes comprising attributes of the managed object that are not the identifying attributes or the relationship attributes, the updating of the detailed attributes performed via scheduled jobs in a message queue, the scheduled jobs executed by the plurality of detail handlers in parallel via multiple computing resources of different computing devices of the management platform.

17. The system of claim 16, wherein the obtained identifying attributes comprise a unique identifier corresponding to the target managed object.

18. The system of claim 16, wherein the plurality of managed objects comprise at least one of virtual machines, hosts, clusters, folders, resource pools, metadata representing topology of the managed objects, availability zones, network information, containers, or pods.

19. The system of claim 16, wherein the inventory event comprises at least one of adding the target managed object to the computing environment, removing the target managed object from the computing environment, a periodic inventory refresh event, or a manual inventory refresh event.

20. The system of claim 16, wherein the processing device is further to schedule the job in the message queue for each of the managed object of the plurality of managed objects in the computing environment.

* * * * *